(12) United States Patent
McAlister

(10) Patent No.: US 9,255,560 B2
(45) Date of Patent: Feb. 9, 2016

(54) REGENERATIVE INTENSIFIER AND ASSOCIATED SYSTEMS AND METHODS

(71) Applicant: McAlister Technologies, LLC, Phoenix, AZ (US)

(72) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 14/148,644

(22) Filed: Jan. 6, 2014

(65) Prior Publication Data

US 2014/0261328 A1    Sep. 18, 2014

Related U.S. Application Data

(60) Provisional application No. 61/789,666, filed on Mar. 15, 2013.

(51) Int. Cl.
  *F02M 67/04*    (2006.01)
  *F02M 57/06*    (2006.01)
  (Continued)

(52) U.S. Cl.
  CPC .......... *F02M 67/04* (2013.01); *B60W 30/18127* (2013.01); *F02B 37/10* (2013.01); *F02B 37/14* (2013.01); *F02D 19/0647* (2013.01);
  (Continued)

(58) Field of Classification Search
  CPC ....... F02M 67/04; F02M 67/06; F02M 67/08; F02M 67/10; F02M 67/12; F02M 69/08
  USPC .......... 123/431, 432, 534, 585, 429, 531–532
  See application file for complete search history.

(56) References Cited

U.S. PATENT DOCUMENTS

| 1,037,437 | A | 9/1912 | Chase |
| 1,310,565 | A | 7/1919 | Grunwald |

(Continued)

FOREIGN PATENT DOCUMENTS

| DE | 2410473 A1 | 9/1975 |
| DE | 3151368 A1 | 8/1982 |

(Continued)

OTHER PUBLICATIONS

"Clean, Efficient and Lightweight Propulsion Systems for a Better World," EcoMotors International, Accessed May 19, 2011, http://www.ecomotors.com. 2 pages.

(Continued)

*Primary Examiner* — Thomas Moulis
(74) *Attorney, Agent, or Firm* — Perkins Coie LLP

(57) ABSTRACT

Regenerative intensifier systems that can receive fluids from landfills, anaerobic digesters, wastewater treatment plants, animal waste lagoons, swamp gas, decaying permafrost, and oceanic clathrate decomposition interchangeably with natural gas and other available fuels and substances and provide suitably conditioned fuel for operation of an engine, fuel cell, or other industrial and/or chemical processes. Alternatively, gases collected from landfills, waste digesters, bakeries, breweries, ethanol plants, calciners, power plant stacks, electrolyzers, and/or natural gas that may be delivered at relatively low pressures can be converted to high pressure and/or high purity constituents to enable efficient utilization as a transportation fuel and/or industrial feedstock or chemical plant reactant.

19 Claims, 8 Drawing Sheets

(51) Int. Cl.

| | | |
|---|---|---|
| *F02P 13/00* | (2006.01) | |
| *F02M 21/02* | (2006.01) | |
| *F17C 5/06* | (2006.01) | |
| *B60W 30/18* | (2012.01) | |
| *F02D 19/06* | (2006.01) | |
| *F02B 37/10* | (2006.01) | |
| *F02B 37/14* | (2006.01) | |
| *F02M 67/14* | (2006.01) | |
| *F02D 41/00* | (2006.01) | |
| *F02P 19/02* | (2006.01) | |

(52) U.S. Cl.
CPC ....... *F02M21/0215* (2013.01); *F02M 21/0224* (2013.01); *F02M 21/0227* (2013.01); *F02M 21/0275* (2013.01); *F02M 57/06* (2013.01); *F02P 13/00* (2013.01); *F17C 5/06* (2013.01); *F02B 2275/14* (2013.01); *F02D 41/0027* (2013.01); *F02M 67/14* (2013.01); *F02P 19/021* (2013.01)

(56) References Cited

U.S. PATENT DOCUMENTS

| | | | |
|---|---|---|---|
| 1,401,612 A | 12/1921 | Landgrebe | |
| 1,451,384 A | 4/1923 | Whyte | |
| 1,693,931 A | 12/1928 | Lowe | |
| 1,765,237 A | 6/1930 | King | |
| 1,773,995 A | 8/1930 | Goldsborough | |
| 2,255,203 A | 9/1941 | Wiegand | |
| 2,391,220 A | 12/1945 | Beeh | |
| 2,459,286 A | 1/1949 | Wiegand et al. | |
| 2,710,600 A * | 6/1955 | Nallinger | 123/533 |
| 2,826,395 A | 3/1958 | Petty | |
| 3,060,912 A | 10/1962 | May | |
| 3,094,974 A | 6/1963 | Barber | |
| 3,123,061 A * | 3/1964 | Budroni | 123/534 |
| 3,173,409 A | 3/1965 | Warren | |
| 3,266,234 A | 8/1966 | Cook | |
| 3,315,650 A | 4/1967 | Bishop et al. | |
| 3,373,724 A | 3/1968 | Papst | |
| 3,682,142 A | 8/1972 | Newkirk | |
| 3,754,841 A | 8/1973 | Grabb et al. | |
| 3,792,762 A | 2/1974 | Ball et al. | |
| 3,815,555 A | 6/1974 | Tubeuf | |
| 3,829,368 A | 8/1974 | Wesley | |
| 3,830,204 A | 8/1974 | McAlister | |
| 3,908,625 A | 9/1975 | Romy | |
| 3,926,169 A | 12/1975 | Leshner et al. | |
| 3,976,034 A | 8/1976 | Shinohara et al. | |
| 3,980,061 A | 9/1976 | McAlister | |
| 4,003,343 A | 1/1977 | Lee | |
| 4,020,803 A | 5/1977 | Thuren et al. | |
| 4,041,910 A | 8/1977 | Houseman | |
| 4,046,522 A | 9/1977 | Chen et al. | |
| 4,066,046 A | 1/1978 | McAlister | |
| 4,086,877 A | 5/1978 | Henkel et al. | |
| 4,086,878 A | 5/1978 | Eisele et al. | |
| 4,099,489 A | 7/1978 | Bradley | |
| 4,108,114 A | 8/1978 | Kosaka et al. | |
| 4,109,461 A | 8/1978 | Fujitani et al. | |
| 4,111,160 A | 9/1978 | Talenti | |
| 4,140,090 A | 2/1979 | Lindberg | |
| 4,161,657 A | 7/1979 | Shaffer, Jr. | |
| 4,165,616 A | 8/1979 | Pierpoline | |
| 4,181,100 A | 1/1980 | Yamane et al. | |
| 4,201,160 A * | 5/1980 | Fenne | 123/300 |
| 4,211,200 A | 7/1980 | Rocchio et al. | |
| 4,235,533 A | 11/1980 | Norris | |
| 4,244,330 A | 1/1981 | Baugh et al. | |
| 4,249,386 A | 2/1981 | Smith et al. | |
| 4,253,428 A | 3/1981 | Billings et al. | |
| 4,340,013 A | 7/1982 | Lindstrom | |
| 4,362,137 A | 12/1982 | O'Hare | |
| 4,373,671 A | 2/1983 | Giardini | |
| 4,376,097 A | 3/1983 | Emelock | |
| 4,381,740 A | 5/1983 | Crocker | |
| 4,382,189 A | 5/1983 | Wilson | |
| 4,408,595 A | 10/1983 | Broyles et al. | |
| 4,418,653 A | 12/1983 | Yoon | |
| 4,441,469 A | 4/1984 | Wilke | |
| 4,442,801 A | 4/1984 | Glynn et al. | |
| 4,475,484 A | 10/1984 | Filho et al. | |
| 4,503,813 A | 3/1985 | Lindberg | |
| 4,515,135 A | 5/1985 | Glass | |
| 4,547,356 A | 10/1985 | Papineau | |
| 4,603,671 A | 8/1986 | Yoshinaga et al. | |
| 4,606,308 A | 8/1986 | Furlong | |
| 4,642,992 A | 2/1987 | Julovich | |
| 4,656,993 A | 4/1987 | Yuzawa et al. | |
| 4,663,938 A | 5/1987 | Colgate | |
| 4,716,859 A | 1/1988 | Konig et al. | |
| 4,722,303 A | 2/1988 | Leonhard | |
| 4,744,343 A | 5/1988 | Bisenius et al. | |
| 4,765,304 A * | 8/1988 | Brown | 123/532 |
| 4,768,341 A | 9/1988 | Nozaki et al. | |
| 4,771,754 A * | 9/1988 | Reinke | 123/533 |
| 4,783,966 A | 11/1988 | Aldrich | |
| 4,834,033 A | 5/1989 | Larsen | |
| 4,839,247 A | 6/1989 | Levy et al. | |
| 4,846,114 A * | 7/1989 | List | 123/26 |
| 4,865,002 A * | 9/1989 | Borst et al. | 123/532 |
| 4,890,528 A | 1/1990 | Kamijima | |
| 4,892,065 A * | 1/1990 | List | 123/26 |
| 4,918,916 A | 4/1990 | Tiberg | |
| 4,936,279 A * | 6/1990 | Ragg | 123/533 |
| 4,944,277 A * | 7/1990 | Olson | 123/532 |
| 4,967,708 A | 11/1990 | Linder et al. | |
| 4,971,009 A | 11/1990 | Washino et al. | |
| 4,974,571 A * | 12/1990 | Oppenheim et al. | 123/531 |
| 4,982,708 A | 1/1991 | Stutzenberger | |
| 5,010,734 A | 4/1991 | Ho | |
| 5,025,769 A * | 6/1991 | Plohberger et al. | 123/532 |
| 5,067,467 A * | 11/1991 | Hill et al. | 123/497 |
| 5,108,266 A | 4/1992 | Hewitt | |
| 5,115,771 A | 5/1992 | Ozawa | |
| 5,119,779 A * | 6/1992 | Plohberger et al. | 123/250 |
| 5,149,600 A | 9/1992 | Yamase et al. | |
| 5,150,668 A | 9/1992 | Bock | |
| 5,153,834 A | 10/1992 | Abo et al. | |
| 5,183,011 A | 2/1993 | Fujii et al. | |
| 5,207,185 A | 5/1993 | Greiner et al. | |
| 5,218,941 A | 6/1993 | Suzuki et al. | |
| 5,222,481 A | 6/1993 | Morikawa | |
| 5,228,293 A | 7/1993 | Vitale | |
| 5,229,977 A | 7/1993 | Owen | |
| 5,261,238 A | 11/1993 | Olsen | |
| 5,267,843 A | 12/1993 | Waldrop | |
| 5,279,260 A | 1/1994 | Munday | |
| 5,305,714 A | 4/1994 | Sekiguchi et al. | |
| 5,315,973 A * | 5/1994 | Hill et al. | 123/304 |
| 5,321,980 A | 6/1994 | Hering et al. | |
| 5,343,699 A | 9/1994 | McAlister | |
| 5,357,908 A | 10/1994 | Sung et al. | |
| 5,390,647 A * | 2/1995 | Schechter | 123/532 |
| 5,394,852 A | 3/1995 | McAlister | |
| 5,399,251 A | 3/1995 | Nakamats | |
| 5,447,142 A * | 9/1995 | Bailey | 123/527 |
| 5,488,932 A | 2/1996 | Serafini | |
| 5,497,744 A | 3/1996 | Nagaosa et al. | |
| 5,505,824 A | 4/1996 | McElroy | |
| 5,512,145 A | 4/1996 | Hollenberg | |
| 5,522,358 A | 6/1996 | Clarke | |
| 5,531,199 A | 7/1996 | Bryant et al. | |
| 5,566,450 A | 10/1996 | Rao et al. | |
| 5,590,635 A * | 1/1997 | Piock et al. | 123/532 |
| 5,613,475 A * | 3/1997 | Firey | 123/496 |
| 5,632,870 A | 5/1997 | Kucherov | |
| 5,647,336 A * | 7/1997 | Piock et al. | 123/532 |
| 5,666,928 A * | 9/1997 | Ma | 123/534 |
| 5,676,096 A | 10/1997 | Nishi et al. | |
| 5,685,272 A * | 11/1997 | Paul et al. | 123/446 |
| 5,692,458 A | 12/1997 | Green | |
| 5,715,788 A | 2/1998 | Tarr et al. | |

(56) References Cited

U.S. PATENT DOCUMENTS

| | | | |
|---|---|---|---|
| 5,743,241 A * | 4/1998 | Wood et al. | 123/531 |
| 5,806,474 A * | 9/1998 | Paul et al. | 123/90.12 |
| 5,824,890 A | 10/1998 | La Palm et al. | |
| 5,837,110 A | 11/1998 | Dean | |
| 5,899,071 A | 5/1999 | Stone et al. | |
| 5,900,330 A | 5/1999 | Kagatani | |
| 5,910,773 A | 6/1999 | Brownlee | |
| 5,983,855 A | 11/1999 | Benedikt et al. | |
| 5,991,670 A | 11/1999 | Mufford et al. | |
| 6,155,212 A | 12/2000 | McAlister | |
| 6,172,500 B1 | 1/2001 | Bicking | |
| 6,239,336 B1 | 5/2001 | Orii et al. | |
| 6,260,546 B1 * | 7/2001 | Vaughn | 123/585 |
| 6,289,869 B1 | 9/2001 | Elliott | |
| 6,298,825 B1 * | 10/2001 | Hupperich et al. | 123/431 |
| 6,341,591 B1 | 1/2002 | Tsutsumi et al. | |
| 6,374,799 B1 * | 4/2002 | Firey | 123/297 |
| 6,394,056 B1 | 5/2002 | Woodhouse | |
| 6,446,597 B1 | 9/2002 | McAlister | |
| 6,463,889 B2 | 10/2002 | Reddy | |
| 6,640,778 B1 | 11/2003 | Hori | |
| 6,679,233 B1 * | 1/2004 | Melbourne | 123/533 |
| 6,756,140 B1 | 6/2004 | McAlister | |
| 6,787,258 B2 | 9/2004 | Prerad | |
| 6,799,541 B1 | 10/2004 | Clinton et al. | |
| 6,945,208 B2 | 9/2005 | Yonezawa et al. | |
| 7,159,544 B1 | 1/2007 | Studdert et al. | |
| 7,191,738 B2 | 3/2007 | Shkolnik | |
| 7,267,106 B2 | 9/2007 | Adachi et al. | |
| 7,290,506 B2 | 11/2007 | Rau, III et al. | |
| 7,451,728 B1 | 11/2008 | Geer | |
| 7,628,137 B1 | 12/2009 | McAlister | |
| 7,785,451 B2 | 8/2010 | Lin et al. | |
| 7,927,434 B2 | 4/2011 | Nakamura et al. | |
| 7,958,864 B2 * | 6/2011 | Sturman | 123/321 |
| 8,026,288 B2 | 9/2011 | Takenouchi et al. | |
| 8,051,944 B2 | 11/2011 | Nakatsu | |
| 8,245,694 B2 * | 8/2012 | Kuhnke et al. | 123/447 |
| 8,311,723 B2 * | 11/2012 | McAlister | 701/104 |
| 8,342,153 B2 * | 1/2013 | Sturman | 123/435 |
| 2003/0012985 A1 | 1/2003 | McAlister | |
| 2004/0045823 A1 | 3/2004 | Kawase et al. | |
| 2004/0163954 A1 | 8/2004 | Gurry et al. | |
| 2006/0042597 A1 * | 3/2006 | Magel | 123/446 |
| 2006/0054138 A1 * | 3/2006 | Geyer | 123/446 |
| 2006/0060468 A1 | 3/2006 | Weinand | |
| 2006/0213760 A1 | 9/2006 | Tao et al. | |
| 2007/0062813 A1 | 3/2007 | Gentalen et al. | |
| 2007/0221500 A1 | 9/2007 | Hausselt et al. | |
| 2008/0047831 A1 | 2/2008 | Richert et al. | |
| 2008/0271709 A1 * | 11/2008 | Dingle | 123/447 |
| 2009/0065438 A1 | 3/2009 | Chau | |
| 2009/0199828 A1 | 8/2009 | Luttgeharm | |
| 2010/0122688 A1 | 5/2010 | Sihler et al. | |
| 2010/0236648 A1 | 9/2010 | Cheng et al. | |
| 2010/0263619 A1 | 10/2010 | Reymond et al. | |
| 2013/0014517 A1 | 1/2013 | Diederichs et al. | |

FOREIGN PATENT DOCUMENTS

| | | | |
|---|---|---|---|
| DE | 3443022 A1 | 5/1986 | |
| FR | 2262195 A1 | 9/1975 | |
| GB | 1002694 A | 8/1965 | |
| GB | 1038490 A | 8/1966 | |
| GB | 1336636 A | 11/1973 | |
| GB | 2112455 A | 7/1983 | |
| KR | 20030047546 A | 6/2003 | |
| WO | WO-95/27845 A1 | 10/1995 | |

OTHER PUBLICATIONS

Collier Technologies Technology Description; "HCNG"; Nov. 2005; 4 pages.

Davis et al., "Fuel Injection and Positive Ignition—A Basis for Improved Efficiency and Economy", SAE Progress in Technology Review vol. II, Society of Automotive Engineers, 1967, pp. 343-357.

Finegold, et al., "Dissociated Methanol as a Consumable Hydride for Automobiles and Gas Turbines", Jun. 1982, pp. 1359-1369.

Finsterwalder, "Deutz Converts Operation by Adding High-Tension Ignition System", Automotive Engineering, Dec. 1971, pp. 28-32.

European Search Report and Written Opinion for EP Application No. 05027548.6; Dated: Mar. 4, 2009; 6 pages.

European Search Report and Written Opinion for EP Application No. 05027548.6; Dated: Sep. 20, 2010; 13 pages.

European Search Report for European Application No. 05027548.6; Date of Mailing: Feb. 11, 2009; 7 pages.

European Search Report for European Application No. 94920655.1; Date of Mailing: Jun. 27, 1997; 9 pages.

James W. Heffel, University of California; "Hydrogen Powered Shelby Cobra: Vehicle Conversion"; 2003; 14 pages.

Jim Stanam; "How Can Engines Be Modified to Run Using Alternative Fuels?"; Lockheed Martin; Orlando, FL; Jan. 2, 1999, 4 pages.

Robert Priest, Appeal T 383/04-3.2.4 in respect of European Patent Application No. 94920655.1-2311 of Roy E. McAlister; "Declaration of Robert Priest"; Nov. 30, 2005; 3 pages.

Schwartz, Ariel, "Bill Gates, Khosla Ventures Inejct $23.5 Million Into Engine Startup EcoMotors," FastCompany, Jul. 12, 2010, Accessed May 31, 2011, http://www.fastcompany.com/1669471/bill-gates-khosla-ventures-inject-235-million-into-efficient-engine-startup-ecomotors. 2 pages.

Simko et al., "Exhaust Emission Control by the Ford Programmed Combustion Process-PROCO", SAE Paper No. 720052, pp. 249-264.

Charles W. Lopez, Kenneth W. Stone; Contractor Report; Performance of the Southern California Edison Company Stirling Dish; Oct. 1993.

International Searching Authority, International Search Report and Written Opinion for International Application No. PCT/US2014/026836, mailed Aug. 14, 2014, 10 pages.

* cited by examiner

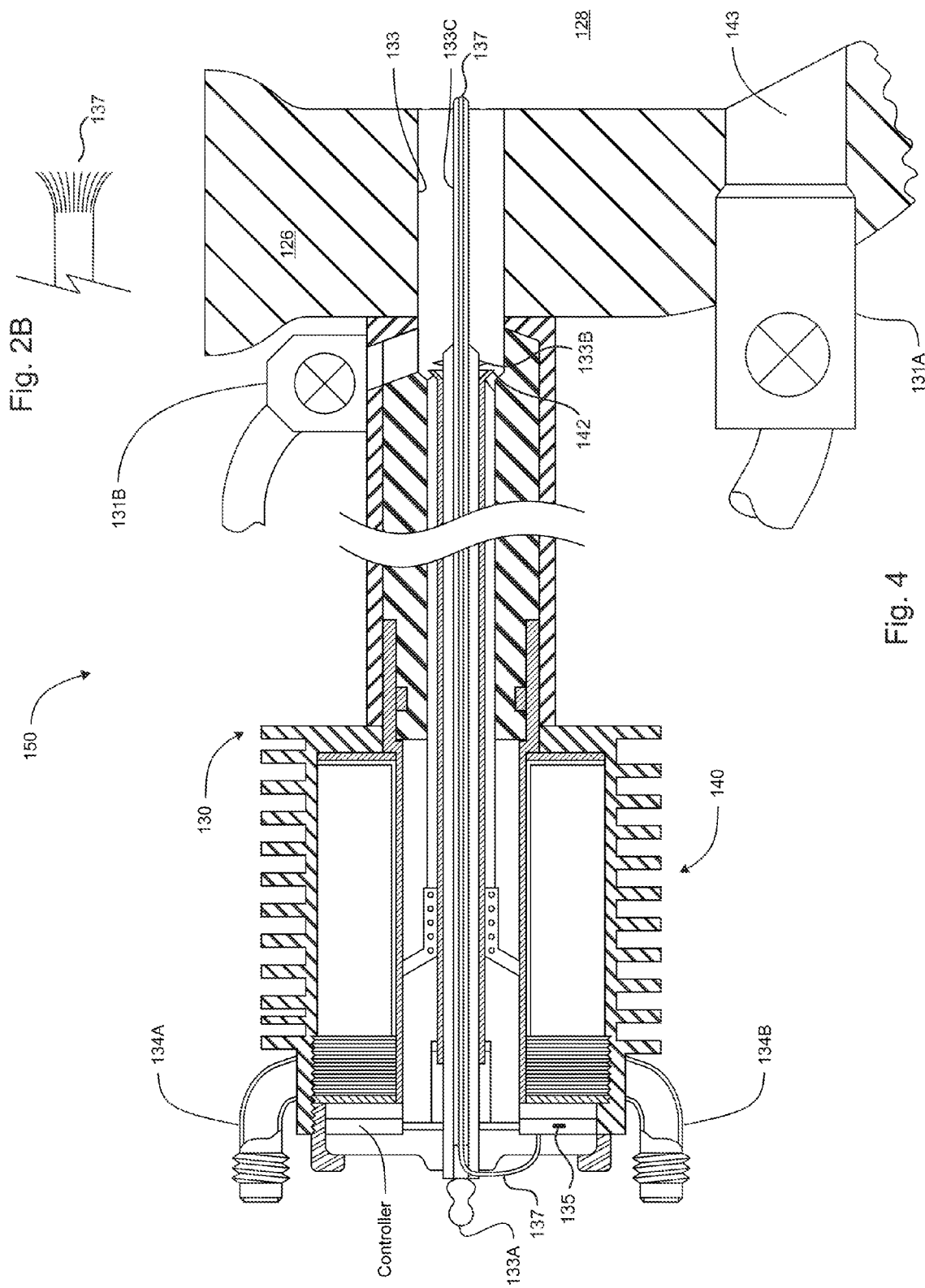

REGENERATIVE INTENSIFIER AND ASSOCIATED SYSTEMS AND METHODS

CROSS-REFERENCE TO RELATED APPLICATIONS

The present application claims the benefit of U.S. Provisional Patent Application No. 61/789,666, filed Mar. 15, 2013, the disclosure of which is incorporated herein by reference in its entirety.

BACKGROUND

Vast amounts of biomass waste could be converted into methane, carbon and other valuable substances and more efficient technology is needed to separate and pressurize these products for storage, conveyance, to market and/or for many chemical reactions. Similarly many commercial and industrial customers have access to pipeline deliveries of relatively low pressure natural gas that may contain considerable amounts of impurities such as water vapor, nitrogen, H2S, silanes, and heavier hydrocarbons. It may not be economically feasible to provide suitable pressurization and appropriate separation processes to remove impurities by conventional methods and operations because of prohibitive capital expenses for a prime mover, compressor, and various filters that may be used for separation and/or the maintenance costs for suitably efficient operation. Embodiments of the present system provide new multifunctional operations, and processes, and outcomes to overcome these problems.

BRIEF DESCRIPTION OF THE DRAWINGS

Non-limiting and non-exhaustive embodiments of the devices, systems, and methods, including the preferred embodiment, are described with reference to the following figures, wherein like reference numerals refer to like parts throughout the various views unless otherwise specified.

FIG. 2B shows an enlarged view of fiber instrumentation 137 for relaying temperature, pressure, combustion pattern and other data to controller 135.

FIG. 4 is a side view in cross-section of the fuel injector-igniter shown in FIG. 3;

DETAILED DESCRIPTION

Figure 1:
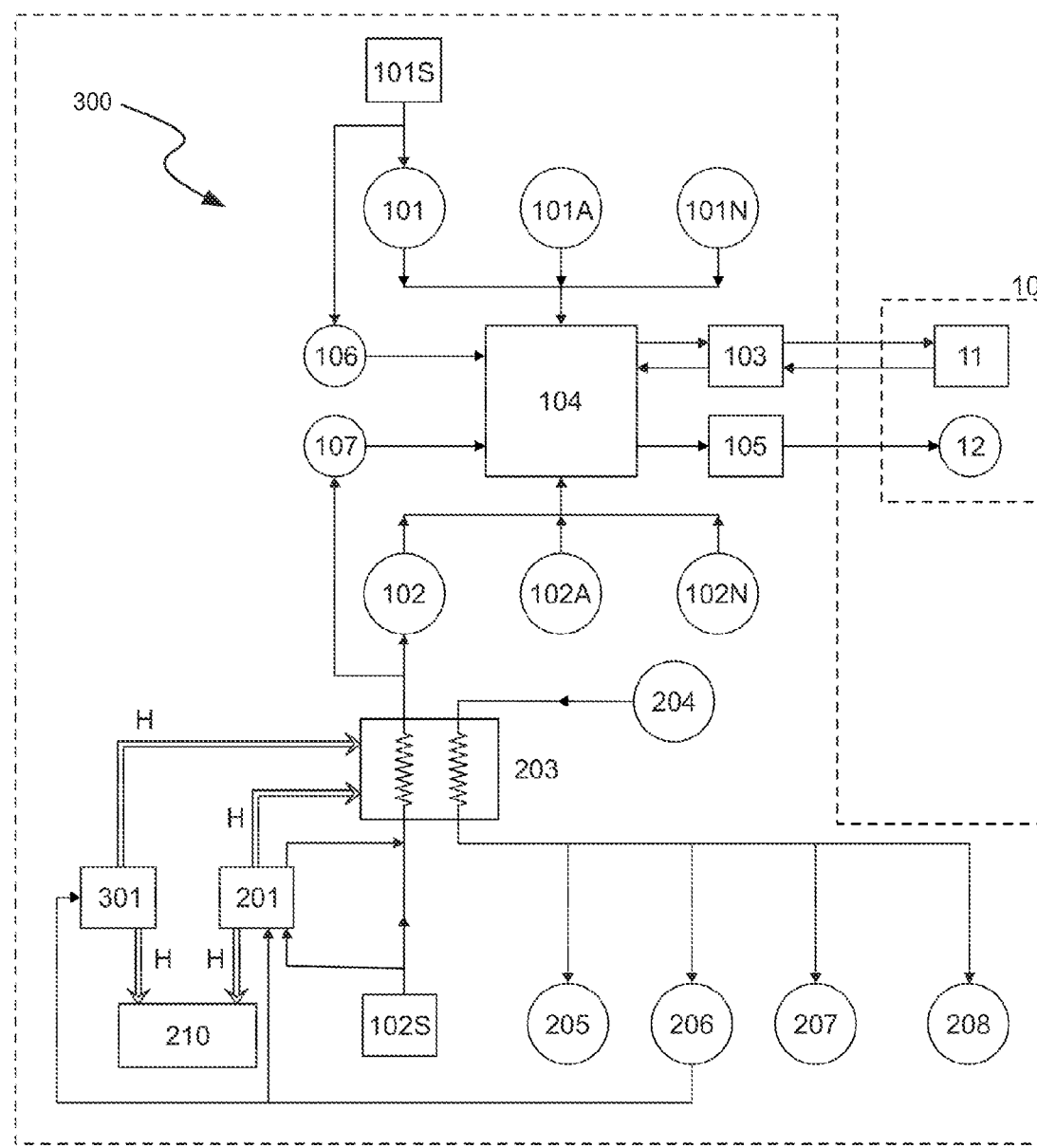
FIG. 1 is a schematic diagram, showing a sustainable fuel-filling system in accordance with a representative embodiment of the present technology.

Disclosed herein are regenerative intensifier systems that can receive fluids from landfills, anaerobic digesters, wastewater treatment plants, animal waste lagoons, swamp gas, decaying permafrost, and oceanic clathrate decomposition interchangeably with natural gas and other available fuels and substances and provide suitably conditioned fuel for operation of an engine, fuel cell, or other industrial and/or chemical processes. In other applications regenerative braking may be provided in which the kinetic energy of a vehicle is converted into pressure and/or chemical fuel potential energy. In other applications the range of a gaseous fueled vehicle is extended by providing regenerative intensification of low pressure fuel to enable the storage tank to be effectively emptied. In other applications gases collected from landfills, waste digesters, bakeries, breweries, ethanol plants, calciners, power plant stacks, electrolyzers, and/or natural gas that may be delivered at relatively low pressures can be converted to high pressure and/or high purity constituents to enable efficient utilization as a transportation fuel and/or industrial feedstock or chemical plant reactant.

Details of several embodiments of the technology are described below with reference to FIGS. 1-8. Other details describing well-known engine components and systems, such as fuel systems, ignition components, fuel pumps, regulators, forced induction systems, and the like, have not been set forth in the following disclosure to avoid unnecessarily obscuring the description of the various embodiments of the technology. Many of the details, dimensions, angles, and other features shown in the figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1-8.

Some aspects of the technology described below may take the form of or make use of computer-executable instructions, including routines executed by a programmable computer. Those skilled in the relevant art will appreciate that the technology can be practiced on computer systems other than those described below. The technology can be embodied in a computer or data processor, such as an engine control unit (ECU), engine control module (ECM), fuel system controller, or the like, that is programmed, configured or constructed to perform one or more computer-executable instructions consistent with the technology described below. Accordingly, the term "computer," "processor," or "controller" as generally used herein refers to any data processor and can include ECUs, ECMs, and modules, as well as Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display, LCD, or dedicated display device or mechanism (e.g., a gauge).

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Such networks may include, for example and without limitation, Controller Area Networks (CAN), Local Interconnect Networks (LIN), and the like. In particular embodiments, data structures and transmissions of data particular to aspects of the technology are also encompassed within the scope of the technology.

Valuable carbon products and clean burning hydrogen fuel can be produced from fossil hydrocarbons or locally available renewable resources such as sewage, garbage, farm wastes, and forest slash along with methane from decomposing permafrost and oceanic clathrates by processes such as the reactions of Equations 1A and 1B.

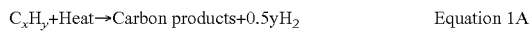

$$C_xH_y + Heat \rightarrow Carbon\ products + 0.5yH_2 \quad \text{Equation 1A}$$

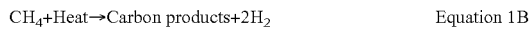

$$CH_4 + Heat \rightarrow Carbon\ products + 2H_2 \quad \text{Equation 1B}$$

Equations 2A, 2B, and 3 show how such hydrogen and nitrogen or oxides of carbon such as carbon dioxide or carbon monoxide can produce liquid fuels that can be stored and shipped in the same type of containers or delivered by the same type of pipelines that now convey fossil fuels. This enables more effective utilization and much greater return on investment in the existing infrastructure. Carbon dioxide can be provided from the atmosphere or from more concentrated sources such as the exhaust stacks of bakeries, breweries, calciners, and power plants with engines that use fuels that contain carbon such as coal, oil, and natural gas hydrocarbons.

$$CO_2 + 3H_2 \rightarrow CH_3OH + H_2O \quad \text{Equation 2A}$$

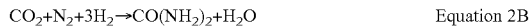

$$CO_2 + N_2 + 3H_2 \rightarrow CO(NH_2)_2 + H_2O \quad \text{Equation 2B}$$

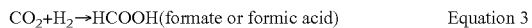

$$CO_2 + H_2 \rightarrow HCOOH(\text{formate or formic acid}) \quad \text{Equation 3}$$

Figure 3:
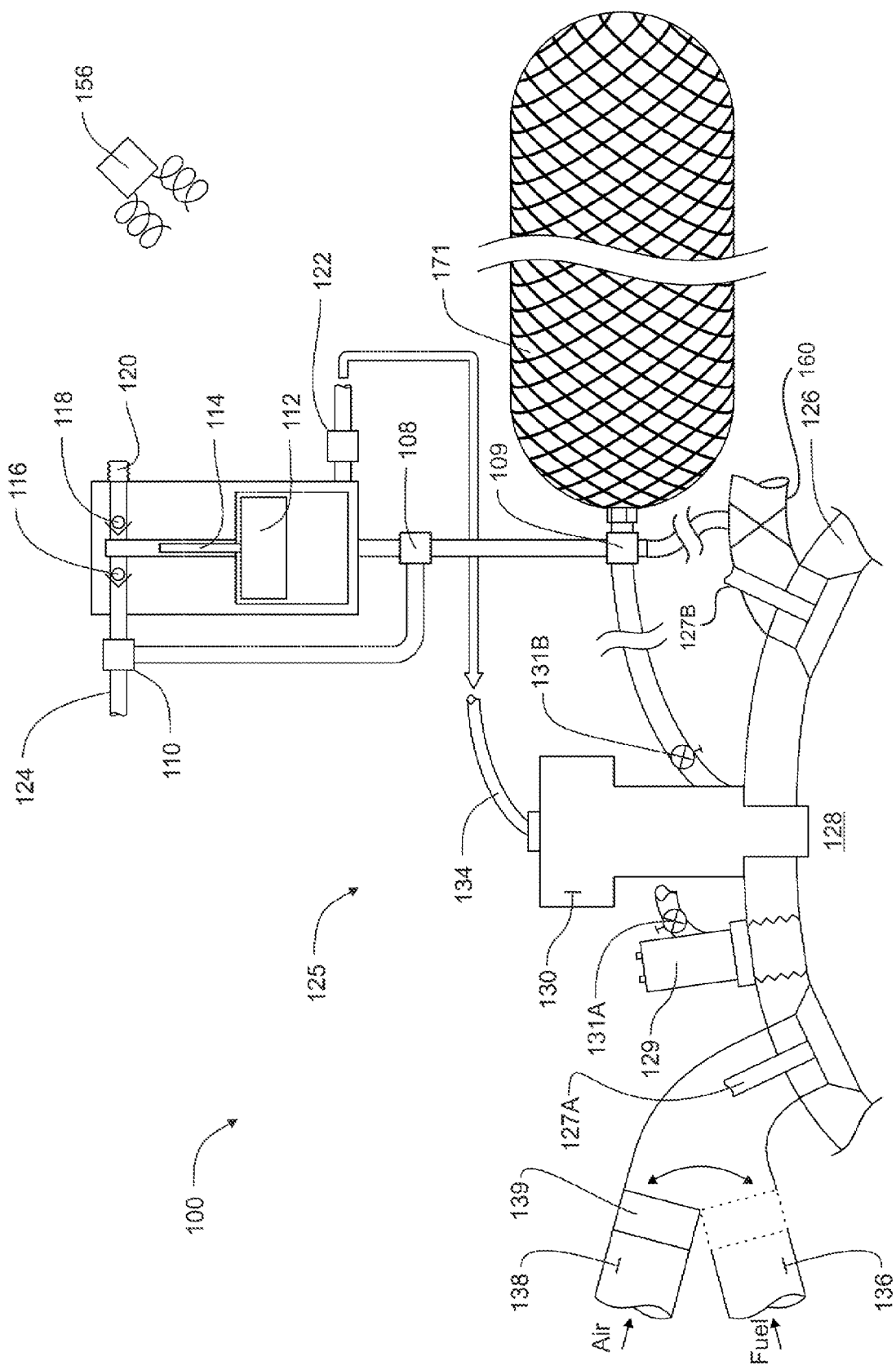
FIG. 3 illustrates a system for producing pressurized fluids from the combustion chamber of an internal combustion engine in accordance with a representative embodiment of the present technology.
Figure 7:
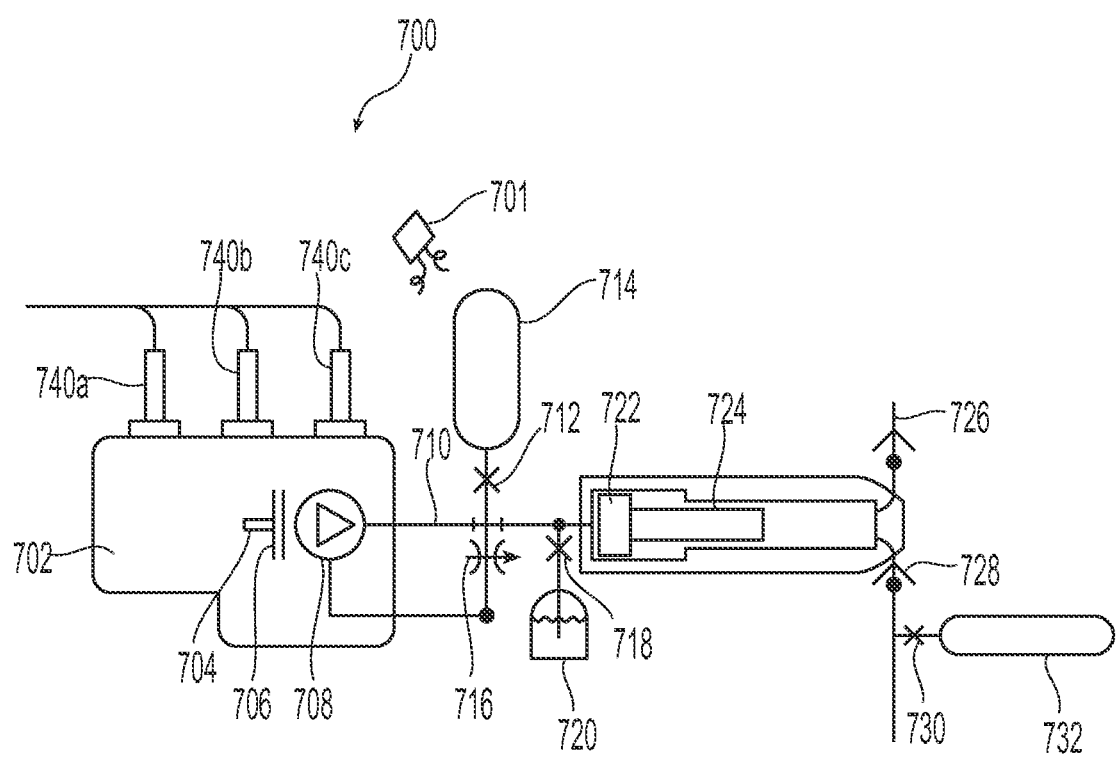
FIG. 7 illustrates a pressurizing process according to another embodiment.

In the process summarized by Equation 2A, four molecular masses or "moles" of gases are combined to produce two moles that occupy a much smaller volume such as methanol and water liquids. In the process of Equation 3, two moles of gases are combined to produce one mole of much smaller condensed liquid volume. Reactions that produce such reductions in moles and occupied volumes provide increased conversion rates and/or higher product yields when provided with the impetus of increased reaction pressure. The embodiment of FIG. 1 shows a system for production of pressurized nitrogen and/or carbon dioxide including the option of liquefaction of air or another more concentrated sources of nitrogen or carbon dioxide. Pressurization is provided as liquid nitrogen and/or carbon dioxide forms a self-pressurized gas as heat is added. In other instances one or more reactants are pressurized by a suitable pump such as an assembly including a piston, cylinder, and suitable valves as shown in FIGS. 3 and 7.

A fuel-filling and storage system 300 is shown in FIG. 1 according to a representative embodiment. In an illustrative application a primary pressure rated receiver tank 12 on a vehicle 10 such as a 700 Bar compressed natural gas tank is loaded with a "net hydrogen" fuel such as methanol, formic acid, urea, ammonia etc., such as produced by processes such as generally summarized by Equations 1, 2A, 2B, and 3. Utilization of a gaseous fuel tank to store such liquid fuels provides much longer range than gaseous fuels including utilization of the receiver tank as a large capacity high pressure accumulator to enable occasional regenerative engine braking to produce compressed fluid (i.e. air or fuel) to drive a pressure booster or intensifier to pressurize fuel product mixtures such as shown by Equations 4-12. As established by LeChatelier's principles, it is advantageous to operate endothermic processes such as summarized by Equations 4-12 at relatively low pressure to enable substantial amounts of low grade heat rejected by the engine coolant (H-1) and/or exhaust system (H-2) to drive such hydrogen, carbon monoxide and/or nitrogen production. Additional energy may be provided such as may be produced by regenerative vehicle suspension components and deceleration components (H-3) to increase the rate or yield of such reactions. Low grade heat driven thermochemical regeneration to produce such products may provide 110 to 140% greater heat release upon combustion than the reactants Additional benefits are provided by utilizing regenerative energy from the suspension system and/or braking by operation of the vehicle's engine as a compressor to pressurize gases such as hydrogen, and/or mixtures of hydrogen with methane, carbon monoxide carbon dioxide and/or nitrogen whereby the hydrogen characterized faster completion of combustion allows the regenerated pressure and the enhanced combustion heat to be added to the combustion chamber after TDC to produce considerably higher engine BMEP, performance, drivability, range, and fuel economy along with extended engine life and reduced maintenance requirements. Although highest performance, volumetric efficiency and fuel economy are provided by stratified charge combustion of such regeneratively pressurized hydrogen-characterized fuels in unthrottled air, considerable advantages are also offered in applications that utilize throttled air and/or homogeneous fuel-air mixtures.

In FIG. 1, the system 300 can include a first storage tank 101 (and 101A-101N), a second storage tank 102 (and 102A-102N), a communicator 103, a controller 104, a dispenser 105, a third storage tank 106, a fourth storage tank 107, one or more such as two engines 201 and 301, a heat exchanger 203, a liquid air storage tank 204, a nitrogen storage tank 205, an oxygen storage tank 206, an argon inert gas group storage tank 207, a carbon dioxide storage tank 208, and a generator 210. The communicator 103 of the system 300 can communicate with the end-user communication device 11 of the vehicle 10, and receive a first set of information, which relates to operator preferences, fuel use, and the vehicle status. In other embodiments, the first set of information can be received by users' manual inputs. The controller 104 can then analyze the first set of information and generate a second set of information that relates to whether (and how) the system 300 can supply the requested selections such as range requirement, greenhouse gas avoidance, carbon sequestration credits, net-hydrogen composition, fossil or renewable fuel origin. The dispenser 105 can selectively dispense the requested selection such as the first and the second renewable fuels to the user-end storage tank 12, according to the second set of information determined by the controller 104. The system 300 can also provide a third set of information to the user while communicating. The third information can be provided automatically or upon users' request. The third set of information can include fuel economy data, greenhouse gas avoidance accounting, preventative maintenance alerts, etc., along with general traveling information, such as points of interest, maps, weather, fuel station locations, or lodging recommendations. In other embodiments, the third set of information can include news headlines, assorted advertisements or other information that users may want to access.

The exchanger 203 is configured between the second storage tank 102 and the second renewable or alternative fuel source 102S, to transform, at least partially, a gaseous second renewable or alternative fuel into a liquid phase (e.g., NG becomes LNG) for compact storage. The heat energy taken from the gaseous second renewable fuel is absorbed by liquid air provided by the liquid air storage tank 204. After absorbing heat energy in the heat exchanger 203, the liquid air can be pressurized or vaporized into one or more gaseous substances. Due to different vapor pressures, boiling points, etc., constituents of the liquid air can be separated by and stored individually. For example, nitrogen separated from the liquid air can be stored in the nitrogen storage tank 205. Similarly, separated oxygen can be stored in the oxygen storage tank 206, separated argon and/or other inert gases can be stored in the argon storage tank 207, and separated carbon dioxide can be stored in the carbon dioxide storage tank 208. The system 300 can have a plurality of additional storage tanks to store other separated gases (or in a liquid form), depending on the selected operation and design embodiment of the system 300. Illustratively, in other embodiments, the separated gases can be stored as liquid substances.

System 300 includes one or more engines 201 and 301. Both engines 201 and 301 and/or generator 210 can provide heat energy "HE" to selected applications either inside or outside the system 300, and to the exchanger 203 to facilitate the pressurization of the liquid air stored in the liquid air storage tank 204. Also, both engines 201 and 301 can remove objectionable substances in the renewable fuels or other fluids as discussed above such as by stratified charge oxidation during combustion in excess air. In other embodiments, the types such as gas turbine, piston or rotary designs and numbers of the engines 201 and 301 can vary depending on different system embodiment designs. The fuels including renewable fuels with different levels of purity can come from the same source in the system 300. The third storage tank 106 can be used to store the first renewable fuel with a higher purity than the first renewable fuel stored in the first storage tank 101. Similarly, the fourth storage tank 107 can be used to store the second renewable fuel with a higher purity than the second renewable fuel stored in the second storage tank 102. For example, the first renewable fuel source 101S can provide a first renewable fuel with different levels of purity, which can be stored in the first storage tank 101 and the third storage tank 106, respectively. Similarly, the second renewable fuel source 102S can provide a second renewable fluid with different levels of purity, which can be stored in the second storage tank 102 and the fourth storage tank 107, respectively. In other embodiments, the system 300 can provide a purification mechanism in order to provide more than one level of purity for the same type of renewable fuel. Fuel filling System 300 is described further in U.S. patent application Ser. No. 13/834,293 filed Mar. 15, 2013, now U.S. Pat. No. 9,133,011, and entitled System and Method for Providing Customized Renewable Fuels, the disclosure of which is incorporated herein by reference in its entirety.

Pressurized hydrogen from the process of Equation 1 is provided by a mechanical compressor, hydride sorption pumping, and/or galvanic impetus for delivery of hydrogen by proton transport across an ambient or elevated temperature proton membrane. Pressurized hydrogen can also be produced by electrolysis with increased applied voltage. Hydrogen produced from wastes such as urea or acids produced by anaerobic digestion can be provided at pressures such as about 700 Bar (10,200 PSI) and may use about the same or less electrical power than electrolysis of water.

Other embodiments for hydrogen separation and pressurization are provided for operation in conjunction with various process reactions shown in Equations 4, 5, and 6. In the process of Equation 4, methane reacts with steam to produce carbon monoxide and hydrogen. Similarly endothermic reactions of Equations 5 and 6 produce hydrogen.

$$CH_4 + H_2O + HEAT \rightarrow CO + 3H_2 \quad \text{Equation 4}$$

$$2NH_3 + HEAT \rightarrow N_2 + 3H_2 \quad \text{Equation 5}$$

$$CO(NH_2)_2 + HEAT \rightarrow N_2 + 2H_2 + CO \quad \text{Equation 6}$$

Figure 2:
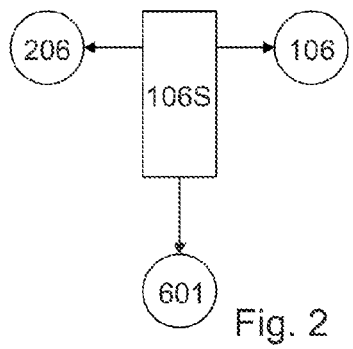
FIG. 2 is a schematic diagram, showing a high-purity source of a renewable fuel in accordance with a representative embodiment.

The hydrogen can be removed as it is produced by such reactions and further pressurized as it is formed by transfer from the reaction zone through a semipermeable membrane. Such removal of a reaction product such as hydrogen provides favorable improvement in the reaction rate and yield efficiency. An embodiment, as shown in FIG. 2, uses heat from an engine such as the exhaust or cooling system of an internal combustion piston or gas turbine engine. This is beneficial for purposes of shifting such reactions towards greater yields and/or allowing higher reactant pressures without reducing yields.

FIG. 2 shows an embodiment of the first high-purity source 106S of the present technology. In this embodiment, the first high-purity source 106S can be an electrolyzer and the first renewable fuel is hydrogen. The water storage 601 provides water to be electrolyzed in the first high-purity source 106S, and hydrogen and oxygen, both with high purity, may be generated. Generated hydrogen can be transported and stored in the third storage tank 106 and generated oxygen can be transported and stored in the oxygen storage tank 206 for further uses. Electrolysis provides a convenient way to generate hydrogen with high purity. Electricity can be provided by the generator 210 and/or by solar thermal or photovoltaic devices, and/or by generators powered by moving water or wind and/or by geothermal energy conversion systems. The first high-purity source is disclosed in U.S. patent application Ser. No. 13/834,293 filed Mar. 15, 2013, now U.S. Pat. No. 9,133,011, and entitled System and Method for Providing Customized Renewable Fuels, the disclosure of which is incorporated herein by reference in its entirety.

Proton conduction for separation and pressurization can be provided in graphene or porous carbon nanotube composites and ceramics such as Perovskite (SrCeO3) oxide. Such reactions at elevated temperatures produce hydrogen that is separated at increased rates by doped Perovskite-type oxides. Such enhanced proton conductivity is provided with membranes such as doped SrCeO3, CaZrO3, BaCeO3 and/or SrZrO3. Suitable dopants include yttrium, ytterbium, europium, samarium, neodymium, and gadolinium.

Hydrogen separation by such oxide ceramics can be enhanced by increased pressure gradient and/or application of a DC bias. In embodiments that apply a DC bias or galvanic drive in the hydrogen separation process, the hydrogen can permeate from a lower H2 pressure on one side to a higher H2 partial pressure on the other side of the membrane and vice versa in which hydrogen permeates from the high pressure to the low pressure side of the membrane. In comparison a non-galvanic hydrogen separation process in which a pressure difference exists, transport may be from the high H2 partial pressure side to a low H2 partial pressure side of the membrane.

Catalysts may be used at a reaction surface to favorably influence surface exchange reactions such as various steps or processes such as summarized by Equations 1, 4, 5, and/or 6. Hydrogen permeation and thus the process yield can be enhanced by coating the membrane with a surface catalyst to reduce the activation energy for the surface exchange reactions. Some anode material selections may be favorable catalysts. Anodes of galvanic hydrogen pumps include porous films of conductive carbon fiber in felt, mat, woven or paper type configurations, Ni, Ag, Pt, and/or Ni/BCY porous layers. In such hydrogen pumping processes, the gas mixture in the anode and cathode zones compartments can include steam or be humidified with water vapor to improve the proton conductivity of the electrolyte and/or suppress its electronic conductivity.

The hydrogen separation rate increases as the applied current is increased in accordance with Faraday's law. Depending upon factors such as reactant pressure and temperature, dopant selection, membrane thickness, and humidity, applied galvanic voltage gradients such as 0.2 to 20 VDC are adequate to produce substantially higher pressure hydrogen. Such net bias of galvanic voltage gradients may be produced by much higher voltage conditioned AC or DC electricity delivered to resistive and/or inductive heating of the reactor-separator tube.

Thus, various mixtures of reactants and products such as $H_2$ along with CO, $CO_2$, $H_2O$, and/or $N_2$ in the anode zone can be separated to provide pressurized $H_2$ at the cathode zone. Such hydrogen pressurization driven by an applied external voltage can move hydrogen from a suitably pressurized gas mixture including reactants and products to higher pressure for delivery for denser storage and injection purposes. Thus, pressurized gases that provide expansive cooling are collected on the anode side of the membrane for injection and expansive cooling before top-dead-center (TDC) and further pressurized hydrogen is delivered from the cathode side at higher pressure into storage for injection at or after TDC to produce expansive heating in piston and/or rotary engine applications.

Such arrangements can be provided with the cathode on the inside diameter of a tube and the anode on the outside diameter or vice versa. Endothermic heat can be added in various steps including "H-1" from engine coolant at 102° C. (215° F.), "H-2" from engine exhaust gases at 315° C. (600° F.) or higher temperature, and "H-3" from electrical bias and/or inductive and/or resistance at 350 to 1600° C. (660 to 2900° F.) as may be controlled to achieve suitable conversion rates, reaction yields, and/or pressurization of hydrogen for engine operation. Renewable or regenerative sources of energy for H-3 include regenerative deceleration of a vehicle, regenerative suspension energy from spring/shock-absorber systems, energy conversion streamlining of a vehicle, or utilization of off peak electricity in embodiments including mobile and stationary engine applications.

Depending upon the pressure desired for hydrogen storage it may be preferred to utilize a more or less coaxial flow circuit that provides for reactants to first gain a portion of H-2 from exhaust gases of a heat engine and then enter into the bore and cathode of a tube reactor and to utilize galvanic hydrogen separation and pressurization to compressively stress the reaction-separation tube in the circuit as shown in FIG. 1. This provides a thermal gradient from exhaust gases to supply the first portion of H-2 and/or H-3 and flexibility including rapid application of regenerative energy to provide additional H-3 at higher adaptively controlled temperatures and/or from other electricity sources as may be used to produce hydrogen at the desired rate and/or pressure such as may be desired for direct injection and stratified charge combustion in engine operations. Certain embodiments use H-3 typically from off-peak grid power such as during the night to prepare stored hydrogen for clean start-up during subsequent operation in transportation applications.

Illustratively following reaction and separation gases from the bore or anode can be injected before TDC to produce expansive cooling and reduction of back work to boost brake mean effective pressure (BMEP). Reactants delivered to the anode within the tube bore at suitable pressure such as 61 Bar (900 PSI) can be reacted to produce hydrogen that is removed to improve the reaction yield and delivered by galvanic separation at voltage gradients of 0.2 to 20 VD to the cathode at the outside zone of the separator tube at suitable pressure such as 122 Bar (1800 PSI) or more to facilitate direct injection at or after TDC with expansive heating and pressure additions to boost BMEP. Thus, engines applied to air compression and/or liquefaction processes and/or production of electricity are provided with increased thermal and fuel efficiencies by these thermo-electro-chemically processes and operations. This includes operation of engines that provide gas compression in one or more combustion chambers and produce power at other times in the same or other combustion chambers as disclosed in U.S. patent application Ser. No. 13/802,202 entitled Multi-Stage Compressors and Associated Systems, Processes and Methods, filed Mar. 13, 2013 the disclosure of which is incorporated herein by reference in its entirety.

In particular embodiments such as system 100 of FIG. 3, the compressed gas such as air stored in one or more storage tanks such as 171 is pressurized by the cyclic action of selected pistons of an internal combustion engine. In still further particular embodiments, the compressed gas such as air is provided during deceleration such as a regenerative braking maneuver. Accordingly, compressing the air has many applications including providing an actuation force for the fairings, jacks, and/or other pneumatically operated components of the vehicle, along with producing a vehicle braking effect as the air is compressed.

FIG. 3 is a schematic illustration of a compressed fluid system 125 that includes a combustion chamber 128 (a portion of which is shown in FIG. 3) coupled to the compressed fluid such as air storage tank 171 in accordance with a particular embodiment of the present technology. The combustion chamber 128 is positioned within a cylinder 126 (a portion of which is shown in FIG. 3) which includes an intake valve 127A and an exhaust valve 127B. The cylinder 126 can also include a fuel injector and/or igniter 130 (coupled to a fuel supply line 134) and/or another access to the combustion chamber such as glow plug 129. The fuel injector/igniter 130 and/or the glow plug 129 can provide access to the interior of the cylinder, via which compressed gas such as air can be withdrawn and directed into the compressed air storage tank 171. For example, the replacement device for glow plug 129 can include a first flow director valve 131A and the fuel injector/igniter 130 can include a second flow director valve 131B, each of which is positioned to selectively allow compressed gas such as air from the combustion chamber 128 into the compressed gas storage tank 171 via a storage tank valve 109. In other embodiments, a single flow director valve directs the compressed air exiting the cylinder 128. In particular embodiments, air alone is compressed in the combustion chamber during a braking maneuver, and transferred or released into the storage tank 171. In some applications the exhaust valve 127B is used along with a flow diverter valve 160 to transfer compressed gas to four-way valve 109 during regenerative compression operations. In other embodiments, the air in the combustion chamber can be ignited prior to the piston (not visible in FIG. 3) reaching top dead center, to provide additional back force on the piston and crankshaft, which slows the vehicle in which the piston operates. In some applications air and/or fuel remaining or that may be injected by device 130 into the combustion chamber is combusted in the following or a subsequent power stroke.

In particular embodiments, the compressed air or oxygen extracted from such compressed air is used to support partial oxidation of fuels (e.g., hydrocarbons) to produce hydrogen that is used in reactions such as shown by Equations 2A, 2B or 3 and/or occasionally added to the combustion chamber 128. In this way, the engine can be operated at idle, acceleration, cruise, full power etc., without throttling the inlet air supplied to the combustion chamber for purposes such as higher performance, greater efficiency, reduced maintenance costs and/or reduced or eliminated environmental impact. By adaptively controlling the addition of hydrogen to the combustion chamber, embodiments of the system enable alternative fuels such as natural gas, methanol, ethanol, propane, ethane, methane and various other fuel selections to produce much higher fuel economy and engine performance, without throttling of the inlet air. Accordingly, operation of the combustion chamber includes such benefits with homogeneous and stratified charge fuel-air mixtures, as described further below with reference to FIG. 4.

Embodiment 100 provides for selection of gases such as air through manifold 138 or as selected by valve 139 for admission through manifold 136, natural gas, hydrogen, producer gas, nitrogen, or oxygen from suitable sources and/or storage by suitable valve operations such as a spool or swing gate 139 and intake valve 127A to allow cylinder 128 to fill during the intake cycle of one or more combustion chambers of a multicylinder piston engine. After closure of valves 127A and 127B as the piston (not shown) moves toward top dead center (TDC), valves 131A and/or 131B open to allow the selected gas to be compressed and delivered through valve 109 into storage in one or more pressure vessels such as 171. Valve 131A can be provided as a separate component or it may be incorporated in a device that replaces the glow plug of an engine.

Valve 131B can be a component of fuel injector assembly 130 as shown in FIG. 4. Small amounts of fuel-oxidant mixtures that may result of gas transfers past valve 139 can be reacted in components 129, 130 and/or in one or more tanks such as 171 by one or more suitable ignition sources including selections such as spark or ionizing conditions between electrodes 133 and 133B and/or 133C or by similar electrodes in 131A and/or catalytic surfaces and/or heated elements and/or in other locations by suitable catalysts, spark, hot spots or filaments within the system such as tanks 171.

In operation of another combustion chamber or in a subsequent operation of chamber 128, according to the position of valve 139, the selected gas such as air is admitted during the intake cycle to produce an inventory of gas. After closure of valves 127A and 127B additional gas is added from a tank such as 171 through valves 109, 131A and/or 131B to increase the inventory of compressible gas in chamber 128. Thus as the piston approaches TDC the increased inventory of compressed gas is transferred into another higher pressure tank (such as 171 but not shown) or into tank 171. Repeated process steps that increase the inventory and pressure in one or more storage tanks such as 171 are performed in the same or other cylinders of a multi-cylinder engine to produce the desired capacity for regenerative braking and/or the magnitude of pressurization desired for applications including regenerative operation of a suitable intensifier such as 112-114-116-118.

Virtually any combustion chamber such as 128 can be returned to power production by operation with a decreased, normal, or increased inventory of compressed gas such as air. In instances that a certain portion of the oxidant is removed from the combustion chamber in the regenerative pressurization step, the remaining reduced inventory portion of oxidant can be utilized to support combustion and work production during the following power cycle. In other instances additional oxidant is inserted into the combustion chamber during the compression and/or combustion cycle from storage in accumulator vessels such as tank 171. Such additional oxidant is used as a combustant and/or surplus inventory for improved efficiency by stratified charge combustion of fuel injected by assembly 130 including selections such as natural gas, hydrogen, producer gas, carbon monoxide, and/or other fuel selections including mixtures and fuels that have been separated by exemplary processes summarized by Equations 4-12. Such gases include selections that have been favorably produced by relatively low pressure reactions and subsequently intensified in pressure for increased energy density or to provide impetus to pressure-aided reactions, or to utilize increased pressure to improve BMEP of the host or other engines. Such operations may be achieved by adaptive management by controller 135. FIG. 2B shows an enlarged view of fiber instrumentation 137 for relaying temperature, pressure, combustion pattern and other data to controller 135 and/or 156.

Gas from pressurized storage such as in tank 171 can be used to power a pressure intensifier piston 112 to provide force from a larger piston area to suitably smaller area of piston 114 to produce high pressure of the same gas that may be supplied through valves 108 and 110 or the intensifier can increase the pressure of another gas that is admitted through conduit 124, valve 110, suitable flow control valve such as inlet check valve 116, and supplied through outlet check valve 118 to higher-pressure applications through fitting 120.

In some applications the gas that is selected from manifold 138 or from manifold 136 and compressed in cylinder 128 is a first gas selection that is different than the second gas selection that is pressurized by the action of piston 112 according to force produced by the first gas on the area of piston 112, which may be the same, larger or smaller than the piston area of piston 114. Area ratios of piston 112 and 114 depend upon the fluid selections and purposes of each fluid selection. Illustratively, the first gas may be utilized in a reaction such as shown by process Equations 4-12 and the second gas may be one or more products of such reactions to thus accomplish reactions that occur at a lower temperature and/or pressure and delivery of one or more products at higher or lower temperature and/or pressure according to the ratio of the piston sizes.

In certain applications fuels and/or reactants such as methane, ethane, propane, butane, fuel alcohols, formic acid, methylamine, urea, ammonia, and/or water may be stored in a pressure and chemical-compatibility rated tank such as 171. Such contents are transferred for endothermic processing of various hydrogen, carbon, oxygen and/or nitrogen donor reactant combinations and permutations such as shown in exemplary Equations 4-12 etc.

$$CH_4 + H_2O \rightarrow CO + 3H_2 \qquad \text{Equation 7}$$

$$HCOOH + CH_4 \rightarrow 2CO + 3H_2 \qquad \text{Equation 8}$$

$$CH_3OH + H_2O + CH_4 \rightarrow 2CO + 5H_2. \qquad \text{Equation 9}$$

$$C_2H_5OH + CH_4 + 2H_2O \rightarrow 3CO + 7H_2 \qquad \text{Equation 10}$$

$$C_3H_8 + 3H_2O \rightarrow 3CO + 7H_2 \qquad \text{Equation 11}$$

$$HCOOH + C_3H_8 + 2H_2O \rightarrow 4CO + 7H_2 \qquad \text{Equation 12}$$

Such reactions can be favorably accomplished at relatively low pressures to facilitate relatively low temperature processes. The products can be separated by filtration including molecular sieves and hydrogen ion membranes with or without arrangements for galvanic pressurization of the separated hydrogen. In other applications the products can be delivered thorough line 124 for pressurization by the intensifier circuit and delivered through port 120 for various purposes such as direct injection through injectors such as 130 or 150 and/or to a pressurized filter to separate hydrogen from carbon monoxide and remnant reactants.

Intensifier 112-114 utilizes piston sizes selected to produce the desired intensifier output pressure by operation on compressed gas at pressure supplied by compression from combustion chamber 128. Intensifier 112-114-116-118 can be located in any convenient location such as near tank 171 as part of a kit assembly for retrofitting ICE powered vehicles to utilize more desirable fuel preparations such as cleaner hydrogen-characterized fuels shown as the products of the exemplary reactions to reduce or eliminate greenhouse gas production. In certain operations the same pressure rated tank such as 171 provide primary storage of reactants such as shown in Equations 4-12 and subsequently receive portions of the pressurized products such as shown in these equations to increase the delivery of stored contents and/or vehicle range and/or overall operating efficiency. This enables tanks such as 171 to co-function as a reactant storage tank and/or as an accumulator for pressure and/or chemical potential energy produced such as by ICE regenerative compression in addition to heat recovery transfers to drive endothermic reactions. This provides greater fuel efficiency, performance and longer range including utilization of a pressure rated tank such as 171 as an accumulator to enable thermochemical regeneration with low grade waste heat (i.e. H-1 and H-2) from the engine and occasional regenerative engine braking to produce compressed air or fuel to drive the intensifier/booster to eliminate the capital cost and parasitic work of an engine driven compressor or hydraulic pump driven intensifier and to reduce friction brake maintenance expenses.

The gas flow from the return stroke of piston 112 as piston 114 is returned to the beginning position of unidirectional stroking may be used in many applications. Illustratively if the gas stored in tank 171 is fuel, gas the flow from 122 may be added to fuel directed to into chambers such as 128 or it may be directed to another application such as a turbocharger (not shown) that serves the engine to increase power production and/or increase the air supply from the turbo-compressor to the inlet manifold 138 and thus improve initial loading of gas inventory delivered into the combustion chamber and thus the system efficiency and rate that tank 171 is pressurized.

Such operations provide the ability to store selected gases in one or more tanks such as 171 at pressures such as 10 to 245 Bar (150 to 3600 PSI) or more and provide intensified pressurization of the same or other selected gases at higher pressures such as 300 to 1100 Bar (4,400 to 16,000 PSI) or more.

FIG. 4 is a partially schematic, cross-sectional illustration of a representative cylinder head 126 having several features similar to those described above with reference to FIG. 3. As shown in FIG. 4, the fuel injector and/or injector/igniter 150 includes the second flow director valve 131B. At another combustion chamber location and/or as provided at the glow plug location the glow plug 129 shown in FIG. 3 has been replaced with a first flow-director valve 131A. The fuel injector or injector/igniter 130 is coupled to a first fuel supply conduit 134A which can in turn direct fuel or another selected fluid such as compressed air or steam into the combustion chamber 128 via a port 143 and/or through valve 131B at the crank angles for combustion chamber intake or after bottom dead center "BDC" at times that piston 112 is returned to the starting position by a suitable spring, magnet, (not shown) and/or compressed gas between valves 116 and 118 as shown. An actuator assembly 140 controls the fuel delivered through 134A and/or 134B for higher pressure fuel injection processes.

In operation, hydrogen may be directly used or mixed with another fuel and supplied as a pressurized fluid through the first fuel supply conduit 134A or separately through a second fuel supply conduit 134B. This arrangement can provide for numerous combinations that may improve engine performance and efficiency including utilizing a suitable high voltage circuit to supply ignition through a conductor 133A and electrode zones 133B and 133C. The ignition can be by spark, ion acceleration, corona discharge and/or other suitable techniques, so as to combust the fuel admitted through a fuel control valve 142 at a controlled time. Combinations of fuel injection and mixture production options include one or more injections of hydrogen and/or another fuel during the intake and/or compression and/or power strokes to produce stratified and/or homogeneous charge mixtures. With the oxidant in the combustion chamber, one or more injections of fuel supplied from the first fuel conduit 134A can produce a stratified or homogeneous charge, and subsequent injection of a fuel such as hydrogen supplied from the second fuel conduit 134B can provide stratified charge. Further injections of fuel from 134A and/or 134B at or after TDC can supply stratified charge hydrogen along with expansive heating to accelerate ignition and/or combustion. In particular embodiments, one or more injections of suitable mixtures of hydrogen and other fuel selections can produce and ignite stratified charge fuel-air mixtures, and one or more injections of alternative fuel can produce stratified charge into which hydrogen is injected to combust the resulting stratified charge mixture with the oxidant in the combustion chamber. Further details of representative integrated fuel injector and igniter assemblies are described in co-pending U.S. Pat. No. 8,225,768, incorporated herein by reference. Further details of suitable oxygenated fuels, hydrogen-characterized fuels, and associated systems and methods are included in the following documents, each of which is incorporated herein by reference: U.S. Patent Publication No. US2011/0207062, filed Feb. 14, 2011, now U.S. Pat. No. 8,784,095, U.S. Pat. No. 8,070,835 and U.S. Pat. No. 8,365,700.

A benefit of particular embodiments described above may be that hydrogen can be combusted with a hydrocarbon fuel in a manner that avoids the need for throttling the intake air during start up, idle, acceleration, cruise or full power operation. This may reduce system complexity and/or increase system efficiency, for engine systems that use fuels that may have used air throttling to produce satisfactory fuel-air ratios. In particular, due to its low molecular weight, high energy production upon oxidation, and relatively low ignition energy, hydrogen has a much higher velocity and mobility in a reaction environment and can accordingly promote oxidation through a much wider range of fuel-air ratios and do so much more rapidly to accelerate combustion of other participants in the reaction. In particular embodiments, hydrogen may be used so as to further increase efficiency, but even in cases for which hydrogen supplements heavier and/or slower burning fuels, there may be overall efficiency improvements. In any of these embodiments, the hydrogen can be obtained in a dissociation process (e.g. with a hydrocarbon, ammonia, urea, alcohol, water, formaldehyde, formic acid, carbohydrate, protein, lipid, cellulose, grain dust, or another hydrogen donor as a reactant), and/or the hydrogen can obtained via another suitable process including electrolysis of landfill, aerobic or anaerobic digester liquids or water including contaminated sea water.

Figure 5A:
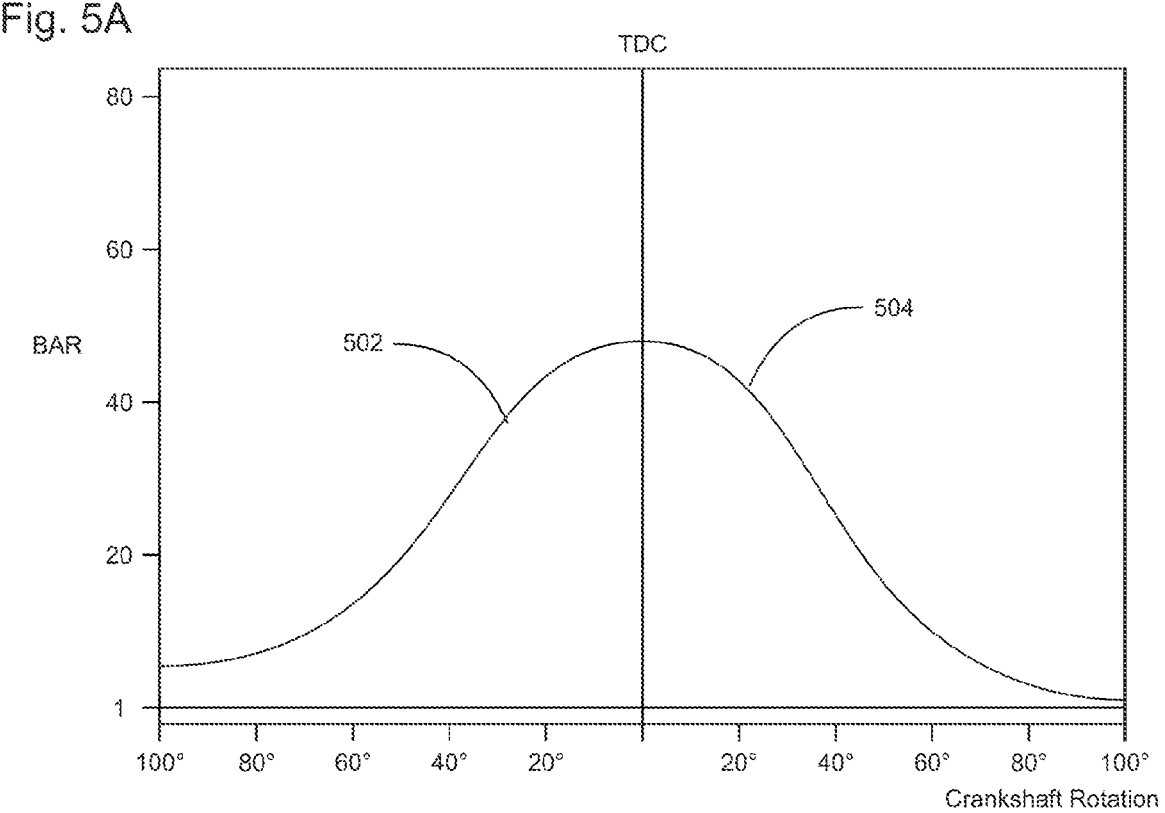
FIG. 5A is a graph illustrating cylinder pressure as a function of crankshaft rotation angle during a representative compression and expansion cycle.

In either of the embodiments described above with reference to FIGS. 3 and 4, the cylinder head assembly 126, combustion chamber 128, and associated piston and crankshaft can be operated in a manner different than that which may be associated with an internal combustion engine operating as a propulsive power source, in order to produce compressed fluid such as fuel or air. FIG. 5A illustrates cylinder pressure as a function of crankshaft rotation angle during a representative compression and expansion cycle. During the compression portion of the cycle 502, gas such as fuel or air in the cylinder is compressed and subsequently and/or during the expansion portion of the cycle 504, the air is expanded and released from the cylinder.

Figure 5B:
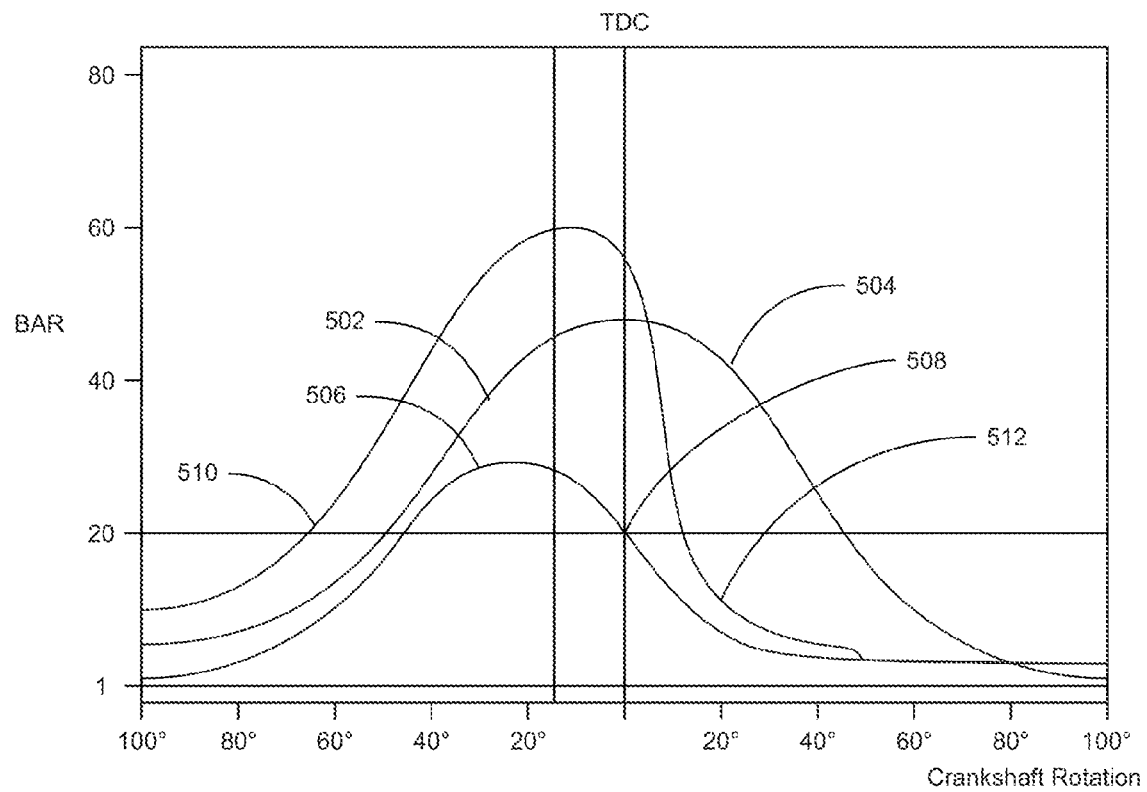
FIG. 5B illustrates the compression and expansion cycle of FIG. 5A in comparison with two additional cycles used to compress air in accordance with embodiments of the present technology.

FIG. 5B illustrates the standard compression and expansion cycle portions 502 and 504 in comparison with two additional illustrative cycles used to compress gas such as fuel or air in accordance with embodiments of the present technology. A first cycle illustrated by a first compression portion 506 which may be altered or the same as 502 is utilized to add compressed gas such as fuel or air to a tank such as 171, and a first expansion portion 508 is produced when a cylinder gas transfer or exhaust cycle is provided by opening valve 131A to a suitable vent such as to a turbocharger inlet to reduce compressive back-work by the host engine and/or to the oxidant or air inlet of the host engine.

In another embodiment, illustrated by a second compression portion starting with unthrottled gas intake through valve 127A, additional gas from a compressed gas storage tank such as 171 is added after closure of 127A to increase the inventory of gas undergoing compression as shown by compression cycle 510. The compressed gas from compression cycle 510 is added to one or more storage tanks such as 171 through valves 127B-160, 131A and/or 131B. A second expansion portion 512 transfers the compressed gas remaining to a suitable vent such as an intake of the host engine or to a turbocharger. Successive repetitions of such operations produces compressed gas such as fuel or air (e.g., compressed to about 20 to 60 bars or more) in one or more storage tanks such as 171.

In particular embodiments described above with reference to FIGS. 5A and 5B, air alone is compressed in the cylinder to produce increased back force (braking force) on the vehicle and/or to provide a source of compressed air. For multicylinder engines, some cylinders can perform an air compression function while others provide a propulsion function and such functions can be selected for various combinations of compression operations in combustion chambers which may be selected to function in sequences such as to provide operation by decreasing vibration etc. The number of cylinders providing compressed air can depend upon the need for compressed air, the need for propulsion (e.g., in response to an acceleration or cruise command), and the need for braking (e.g., in response to a braking command), with the determination computed by an on-board controller or computer 156 and/or 136.

In still further embodiments, the compressed air obtained during a braking operation can be reintroduced to a selected cylinder during a power cycle (e.g., after top dead center) to provide further power applications in a regenerative manner.

Figure 6A:
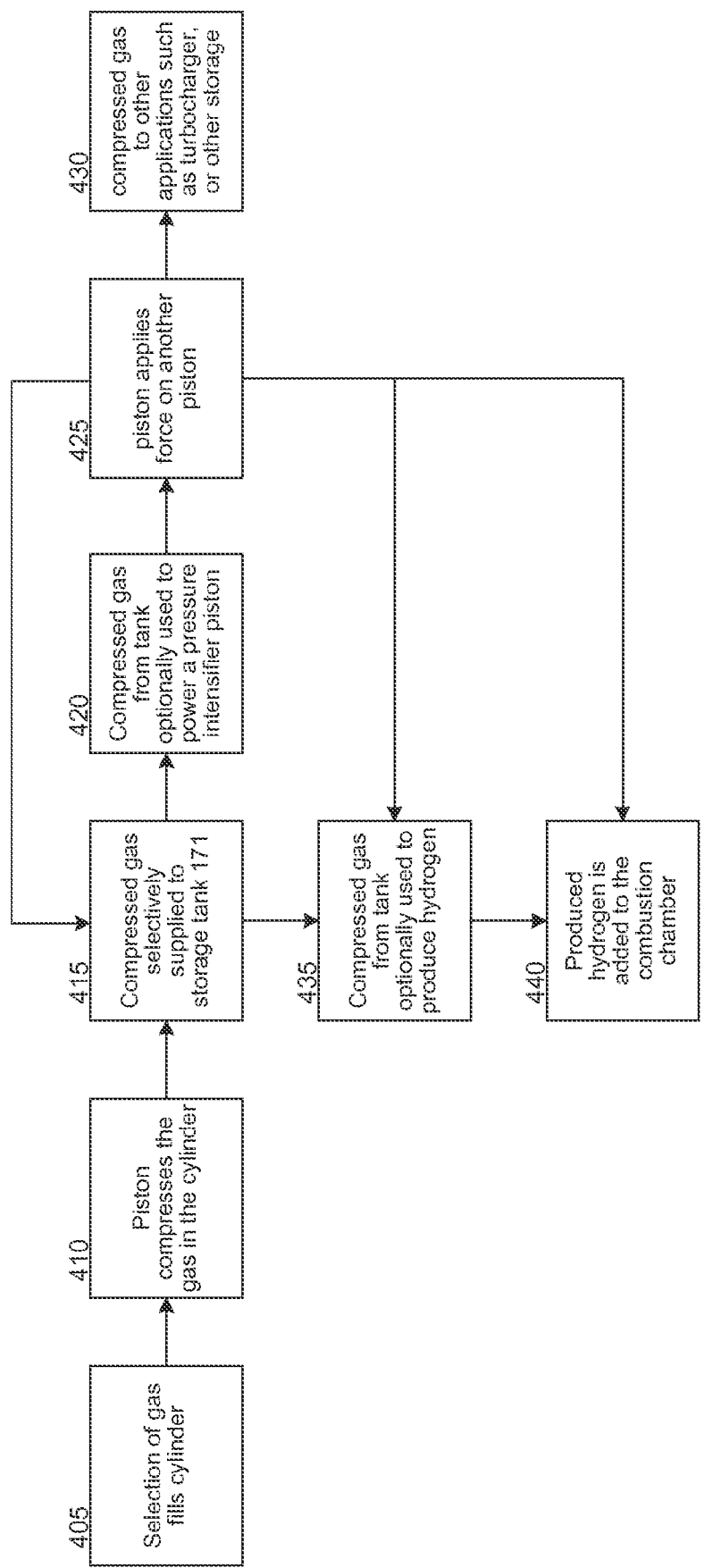
FIG. 6A illustrates a pressurizing process according to a representative embodiment.
Figure 6B:
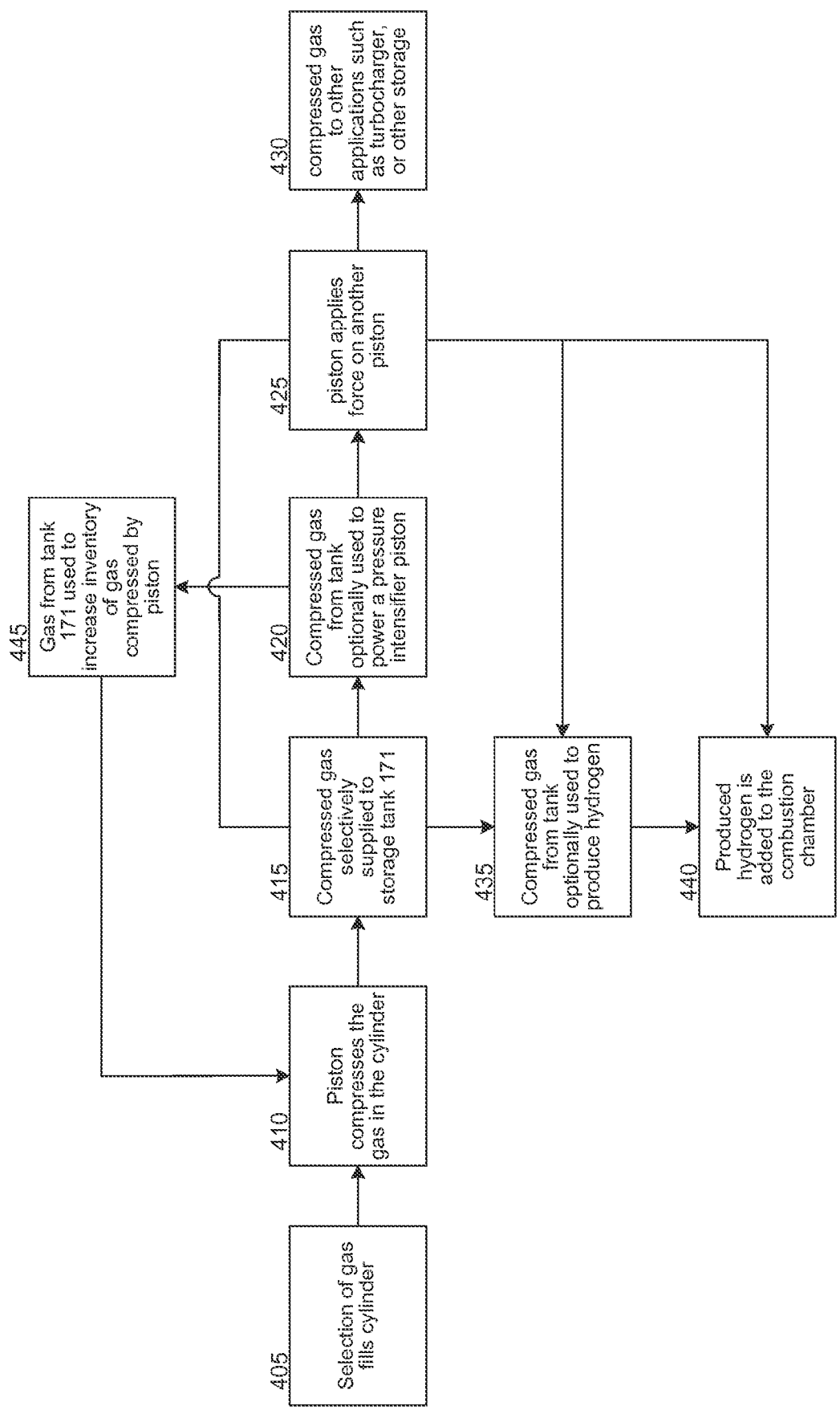
FIG. 6B illustrates a pressurizing process according to another representative embodiment.

FIG. 6A illustrates an example of a pressurizing process flow. In process 405, a gas is allowed to fill cylinder 128. In some embodiments, a swing gate 139 can allow a selection of gas such as one or more fuel substances, process reactants, or air to fill the cylinder 128. In process 410, a piston then compresses the selected gas in the cylinder. In process 415, the compressed gas is then selectively supplied to a selected storage tank such as 171. Optionally, in process 435, the compressed gas from the storage tank 171 can be processed to produce a product such as hydrogen. In process 440, the produced hydrogen can then be added to a selected combustion chamber such as 128. Alternatively, the compressed gas stored in process 415 can be used to power a pressure intensifier piston in process 420. In process 425, the pressure intensifier piston applies a force on another piston such as a larger, equal, or smaller area of another piston, further pressurizing and/or delivering a selected gas. The pressurized gas selection can then be stored (process 415), used to produce a product such as hydrogen (process 435), added to the combustion chamber (process 440), or delivered to other applications such as a turbocharger or sent to other storage (process 430). Optionally, in FIG. 6B, process 445 allows gas from tank 171 to increase inventory of gas compressed by the piston in process 410. Another embodiment provides compressed gas from one cylinder of a multicylinder engine to another cylinder to increase the inventory of gas compressed by the piston in process 410.

In other embodiments, a cylinder performing a braking function can do so while combusting fuel, to increase the back force provided by the piston to increase regenerative braking capacity and/or to increase the temperature of the compressed gas such as may be desired to supply heat to an endothermic process. In such embodiments, fuel can be injected into the cylinder before or after bottom dead center (e.g. to produce a homogeneous or stratified pattern), and can be combusted quickly, with a sufficient supply of oxygen to provide for combustion, but oxidant also may provide insulation within the cylinder. The foregoing operation can be conducted with or without inlet air throttling. Inlet air throttling can produce additional throttling loss or back-work (e.g., braking) to further slow the vehicle. In still further embodiments, the inlet air can be drawn from the internal volume of the fairings discussed above, or other deployable and collapsible elements. For example, as the piston moves downwardly during an intake stroke, it can withdraw air from the inflatable element to quickly stow the element, while proving a braking function and/or re-storing the air as compressed air.

In a particular embodiment, an engine that is capable of producing 500 horsepower may be controlled by the flow director valve(s) for each combustion chamber, and one or more pneumatic loads to produce more than 500 horsepower of braking power by developing a high pressure potential energy and/or work by converting the kinetic energy of the engine's flywheel and other drive train components, along with the kinetic energy of the vehicle. This energy can be stored in the compressed air storage tank described above to recapture much of the energy used during a braking operation if the compressed air in the braking cylinders is combusted, the heat energy produced by the combustion can also be stored in the compressed air tank. The compressed air or other gas can be used to actuate devices such as the fairings described above, or can be converted to other forms of energy including thermochemical and/or pressure potential energy. For example, the compressed gas can be directed through a turbo-alternator (not shown) to produce electricity for various on-board applications that use electric power. Other applications include air conditioning (e.g., heating or cooling), defrosting, among others.

Engines selected from transportation and/or stationary power applications can also be retrofitted with suitable drives (e.g., gears, chains, or belts) that provide for more than doubling the torque applied to slow an engine by exciting and/or loading an existing or larger capacity electricity generator, such as an alternator. Some alternators may produce a higher back-load on the vehicle and can provide a higher voltage and/or current for relatively short periods of time between longer cooling periods. Such embodiments can be further implemented by retrofitting the vehicle with an additional, high capacity alternator and/or storage capacitor or battery capacity.

Embodiment 700 as shown in FIG. 7, utilizes an engine 160 and/or 702 selected from transportation and/or stationary power applications to occasionally drive a mechanical pump 708 to pressurize a suitable working fluid such as a vapor, gas, water, or oil to drive a single or double acting gas pump assembly 722-724-726-728 which comprises a single action portion of a single or double action circuit. This provides the ability to convert the fluid pressure produced by pump 708 to a lower, equal, or greater pressure depending upon the selected size ratio of pistons 722 and 724. In instances that a pressure increase is desired at outlet valve 728, the fluid or hydraulic intensifier converts a given fluid pressure produced by pump 708, which may be delivered through conduit 710 and stored in accumulator 714, to a higher pressure on the output side past valve 728 which may be any suitable type such as a check valve. Thus according to selections of piston sizes 722 and 724 including suitably low friction seals a relatively low pressure to a substantially higher pressure occasionally supplied by pump 708 and/or stored in accumulator 714 can produce a lower, equal, or higher pressure of fluid is supplied through valve 726 and is pressurized by piston 722-724 and delivered past valve 728.

In operation, an electric motor drive 704 and/or mechanical drive assembly 706 occasionally drives pump 708 according to engagement by a clutch component of assembly 706 for operation by controller 701. Such pumping may be applied at times that it is desired to operate accumulator 714 between a maximum and minimum pressure. In an application that has regenerative braking to produce electricity such as a hybrid electric rail locomotive or hybrid car or truck the electricity may drive a rotary or unidirectional motor to power the pump and/or to directly power the intensifier assembly. It is particularly beneficial operate according to controller 701 to decelerate engine 702 for regenerative braking and/or on any other occasion such as may be needed to prevent accumulator 714 from reaching a selected minimum pressure. The amount of regenerative braking is readily adjusted by adaptive control of the pressure produced by pump 708 which may be a variable displacement pump of any suitable design including axial and radial piston types and/or by variation of the pressure by pressure regulator 716.

Such pumping and fluid pressurization operations may be in parallel or series or independent of operation by pressurization assembly comprising pistons 112-114 and valves 116-118. The fluid supplied by receiver tank 720 to pump 708 may be engine oil or coolant or any other suitable fluid. Similarly any suitable fluid may be pressurized by assembly 726-724-728 and stored by accumulator 732 and delivered past valve assembly 730 which may include a pressure regulator. In certain applications it is desirable to utilize a pressure regulator assembly 718 and/or 716 which may include a fluid impedance component to recirculate fluid to pump 708 to smooth operations during transient periods.

In many instances it is desirable to utilize engine waste heat H-1 and/or H-2 and/or regenerative braking of engine 160 and/or 702 to pressurize a fluid such as a fuel produced by vaporization and/or reactions such as exemplified by Equations 4-12 and to increase the pressure supplied by the circuit 700 shown from accumulator 732 for hydrogen-characterized combustion that is facilitated by injectors such as 740A, 740B, 740C etc., to power engine 702. Such operations may provide delivery and combustion of such hydrogen-characterized fuel before, at, or after TDC in unthrottled or throttled oxidant such as air to power engine 702.

In an application, one or more reactants such as designated by process reaction Equations 4-12 are initially pressurized to a relatively low first pressure from a suitable storage or supply circuit such as may be provided by manifold 136 and delivered to one or more suitable heat exchangers whereby such reactions are expedited and/or made more efficient by energy additions of H-1, H-2 and/or H-3. Subsequently one or more products are pressurized to a higher second pressure by the intensifier 112-114-116-118 of FIG. 3 and/or the intensifier 722-724-726-728 of FIG. 7. In certain applications one or more substances supplied at the higher second pressure are supplied to an engine such as 160 or 702 and combusted as a stratified or homogeneous charge with throttled or unthrottled oxidant and introduction to an engine such as 160 or 702 may be before, at, or after TDC. In such applications ignition and/or acceleration of the completion of combustion may be induced by one or more sparks, Lorentz thrust ions, and/or by corona plasma production in such product-oxidant mixtures.

Figure 8:
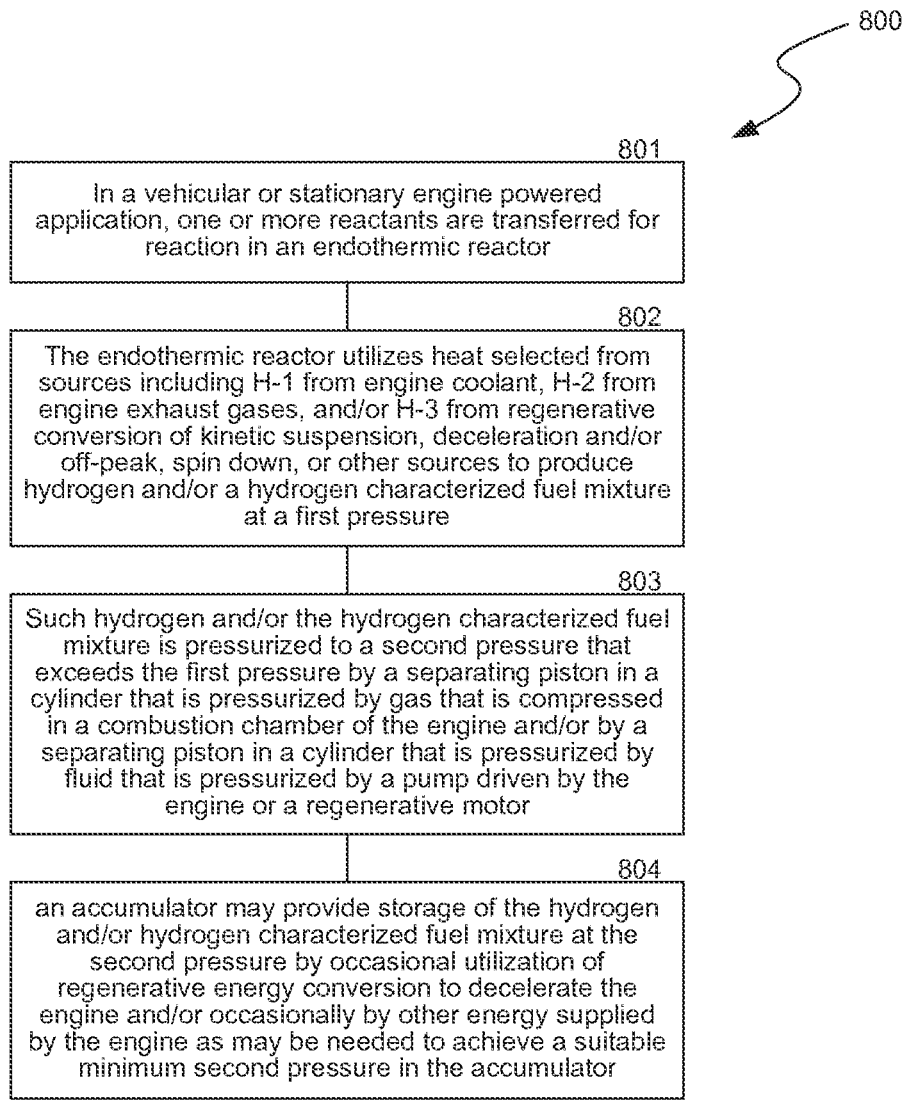
FIG. 8 illustrates a pressurizing process according to another representative embodiment.

As shown in FIG. 8, in a vehicular or stationary engine powered application in Step 801 one or more reactants are transferred for reaction in an endothermic reactor; in Step 802 the endothermic reactor utilizes heat selected from sources including H-1 from engine coolant, H-2 from engine exhaust gases, and/or H-3 from regenerative conversion of kinetic suspension, deceleration and/or off-peak, spin down, or other sources to produce hydrogen and/or a hydrogen characterized fuel mixture at a first pressure; In Step 803 such hydrogen and/or the hydrogen characterized fuel mixture is pressurized to a second pressure that exceeds the first pressure by a separating piston in a cylinder that is pressurized by gas that is compressed in a combustion chamber of the engine and/or by a separating piston in a cylinder that is pressurized by fluid that is pressurized by a pump driven by a suitable motor such as a motor that may utilize regeneratively produced electricity or the engine; in optional Step 804 an accumulator may provide storage of the hydrogen and/or hydrogen characterized fuel mixture at the second pressure by occasional utilization of regenerative energy conversion to decelerate the engine and/or occasionally by other energy supplied by the engine or vehicle or from a delivery grid in stationary engine applications as may be needed to achieve a suitable minimum second pressure in the accumulator. Such exemplary process steps 800 are shown in FIG. 8.

The disclosed technology is described above in the context of particular detailed embodiments. However, numerous other representative embodiments also fall within the scope of the disclosed technology. In an illustrative example, the intensifier of FIGS. 3 and 7 may be selected as single or double acting etc., or may be used in conjunction with another gas or hydraulic driven intensifier or booster such as may be provided by sources such as found at http://www.globalspec.com/Industrial-Directory/gas_pressure_intensifier. Accordingly various applications and combinations of the embodiments disclosed provide:

1) Production of fuels that release more energy upon combustion than the reactant or feedstock selections wherein the production process includes an endothermic reaction.
2) Producing fuels that release more energy upon combustion than the reactants or feedstock selections wherein the production process includes an endothermic reaction and wherein the feedstock includes a liquid substance and/or the product includes a vapor or gaseous substance.

3) Utilizing regenerative energy such as H-1, H-2 and/or H-3 to supply endothermic reaction process energy.
4) Utilizing regenerative stopping or deceleration energy to supply the endothermic reaction process energy.
5) Utilizing regenerative stopping or deceleration energy to pressurize the reaction of any of the previous embodiment steps or combination of steps.
6) Utilizing the pressurized reaction products to increase the BMEP of a positive displacement piston or rotary engine.
7) Pressurization of one or more substances by utilization of stopping or deceleration energy to increase the BMEP of a positive displacement piston or rotary engine.
8) Pressurization of one or more substances by utilization of stopping or deceleration energy to increase the BMEP of a positive displacement piston or rotary engine by direct injection of such substances after TDC.

From the foregoing it will be appreciated that, although specific embodiments of the technology have been described herein for purposes of illustration, various modifications may be made without deviating from the spirit and scope of the technology. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

I claim:

1. An internal combustion engine, comprising:
a cylinder that forms a combustion chamber, wherein the cylinder includes an injector disposed therein having a flow valve and wherein the cylinder includes an exhaust valve having a flow diverter valve;
an intensifier in fluid communication with the combustion chamber;
a pressure tank in fluid communication with the combustion chamber and the intensifier; and
a four way valve connected between the pressure tank, the intensifier, and the combustion chamber, wherein the valve is operative to control multi-directional fluid flow among the pressure tank, the intensifier, and the combustion chamber via the flow valve and the flow diverter valve.

2. The engine according to claim 1, further comprising a glow plug disposed in the cylinder, wherein the four way valve is operatively coupled with a flow valve of the glow plug.

3. The engine according to claim 1, wherein the intensifier includes:
an intensifier piston disposed in a corresponding intensifier chamber having an associated intensifier chamber inlet and outlet; and
a drive piston connected to the intensifier piston and disposed in a corresponding drive chamber having an associated drive chamber inlet and outlet.

4. The engine according to claim 3, wherein the drive chamber inlet is connected to a conduit extending between the pressure control valve and the pressure tank.

5. The engine according to claim 4, wherein the drive chamber inlet is connected to a selector valve connected to the conduit.

6. The engine according to claim 5, further comprising a fuel injector disposed in the cylinder.

7. The engine according to claim 6, wherein the drive chamber outlet is connected to the fuel injector.

8. The engine according to claim 3, wherein the intensifier chamber inlet is in fluid communication with the drive chamber inlet.

9. An internal combustion engine, comprising:
a combustion chamber;
a fuel injector disposed in the combustion chamber;
an exhaust valve in fluid communication with the combustion chamber;
a pressure tank in fluid communication with the combustion chamber;
a four way valve connected between the pressure tank, an intensifier and the combustion chamber via the fuel injector and exhaust valve, wherein the four way valve is operatively coupled with the fuel injector and operative to control a fluid flow between the pressure tank, intensifier and the combustion chamber; and
wherein the intensifier is in fluid communication with the combustion chamber, including:
an intensifier piston disposed in a corresponding intensifier chamber having an associated intensifier chamber inlet and outlet; and
a drive piston connected to the intensifier piston and disposed in a corresponding drive chamber having an associated drive chamber inlet connected between the four way valve and pressure tank.

10. The engine according to claim 9, wherein the intensifier piston has a working diameter and effective area selected from at least one of smaller, equal, and larger than a working diameter and effective area of the drive piston.

11. The engine according to claim 9, further comprising an inlet check valve and an outlet check valve associated with the intensifier chamber inlet and outlet, respectively.

12. The engine according to claim 11, wherein the drive chamber includes an associated drive chamber outlet connected to the fuel injector.

13. The engine according to claim 11, wherein the drive chamber inlet is connected to a conduit extending between the pressure control valve and the pressure tank.

14. The engine according to claim 13, wherein the drive chamber inlet is connected to a selector valve connected to the conduit.

15. The engine according to claim 13, wherein the intensifier chamber inlet is in fluid communication with the drive chamber inlet.

16. A method of intensifying the pressure of a fluid using an internal combustion engine having a combustion chamber, the method comprising:
supplying the fluid from a supply source to an intensifier including a drive piston operative to act on an intensifier piston;
pressurizing a working fluid in the combustion chamber;
conveying the pressurized working fluid directly from the combustion chamber to the drive piston wherein the working fluid moves the drive piston and intensifier piston, whereby the intensifier piston intensifies the pressure of the fluid;
closing intake and exhaust valves in fluid communication with the combustion chamber; and
opening a flow director valve of a fuel injector in fluid communication with the combustion chamber to allow selected gases to be delivered to the supply source, wherein the supply source is a storage tank.

17. The method according to claim 16, wherein the drive piston has a drive diameter and effective area the intensifier piston has an intensifier diameter and effective area selected from at least one of less, equal, and larger than the drive diameter and effective area.

18. The method according to claim 16, further comprising preventing the fluid from returning to the supply source.

19. The method according to claim 16, subsequent to conveying the pressurized working fluid to the drive piston, conveying the working fluid to an injector on the internal combustion engine.

\* \* \* \* \*